United States Patent [19]

Deutsch et al.

[11] Patent Number: 5,355,663
[45] Date of Patent: Oct. 18, 1994

[54] RELOCATED PIVOTING MOISTENER COLUMN FOR A COTTON PICKER

[75] Inventors: Timothy A. Deutsch, Newton; Joel M. Schreiner, Ankeny, both of Iowa

[73] Assignee: Deere & Company, Moline, Ill.

[21] Appl. No.: 42,046

[22] Filed: Mar. 31, 1993

[51] Int. Cl.⁵ .............................................. A01D 46/18
[52] U.S. Cl. ........................................ 56/12.1; 56/41
[58] Field of Search .................. 56/41, 43, 44, 47, 50, 56/12.1

[56] References Cited

U.S. PATENT DOCUMENTS

| | | | |
|---|---|---|---|
| 2,567,301 | 9/1951 | Rust | 56/41 |
| 3,427,791 | 2/1969 | Hubbard | 56/41 |
| 3,525,202 | 8/1970 | Madden | 56/50 |
| 3,546,862 | 12/1970 | Fergason | 56/41 |
| 4,483,132 | 11/1984 | Head, Jr. | 56/50 |
| 4,793,127 | 12/1988 | Sheldon | 56/41 |
| 4,821,497 | 4/1989 | Deutsch et al. | 56/41 |
| 4,821,498 | 4/1989 | Deutsch et al. | 56/50 |
| 4,850,184 | 7/1989 | Deutsch et al. | 56/41 |

Primary Examiner—Terry Lee Melius

[57] ABSTRACT

A cotton harvester row unit with an upright moistener column located at low acceleration point in the spindle path near the side of the harvesting drum diametrically opposite the row receiving area, rather than near the forward extremity of the drum, to decrease row unit length, increase spindle time in the column and better align moistener pad fins with the grooves between the barbs on the spindles. The moistener column pivots outwardly and can be accessed away from the row unit housing for servicing the moistener pads and fluid distribution system. The distributor and nozzle are supported outside the housing in both the operating and the access positions.

19 Claims, 3 Drawing Sheets

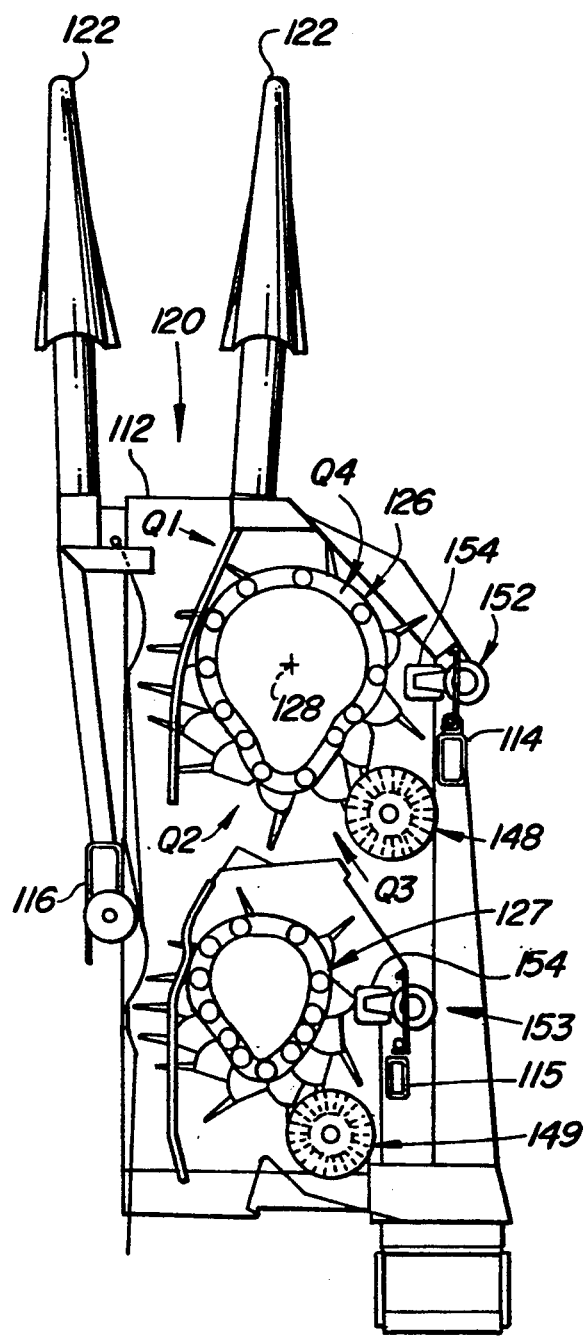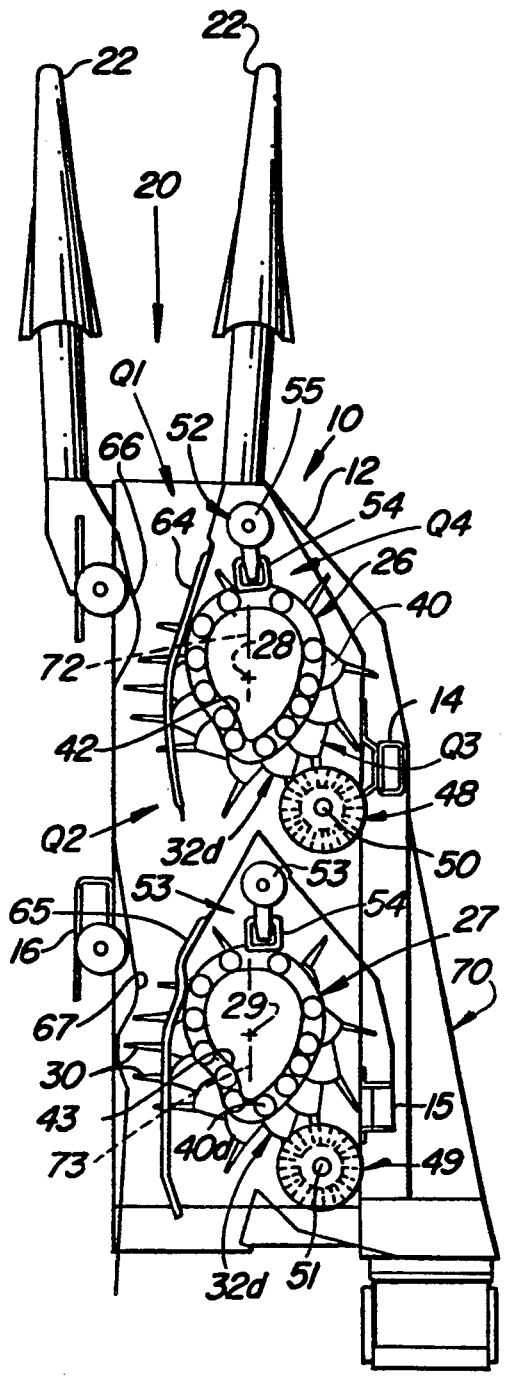
Fig. 2
Fig. 1
(PRIOR ART)

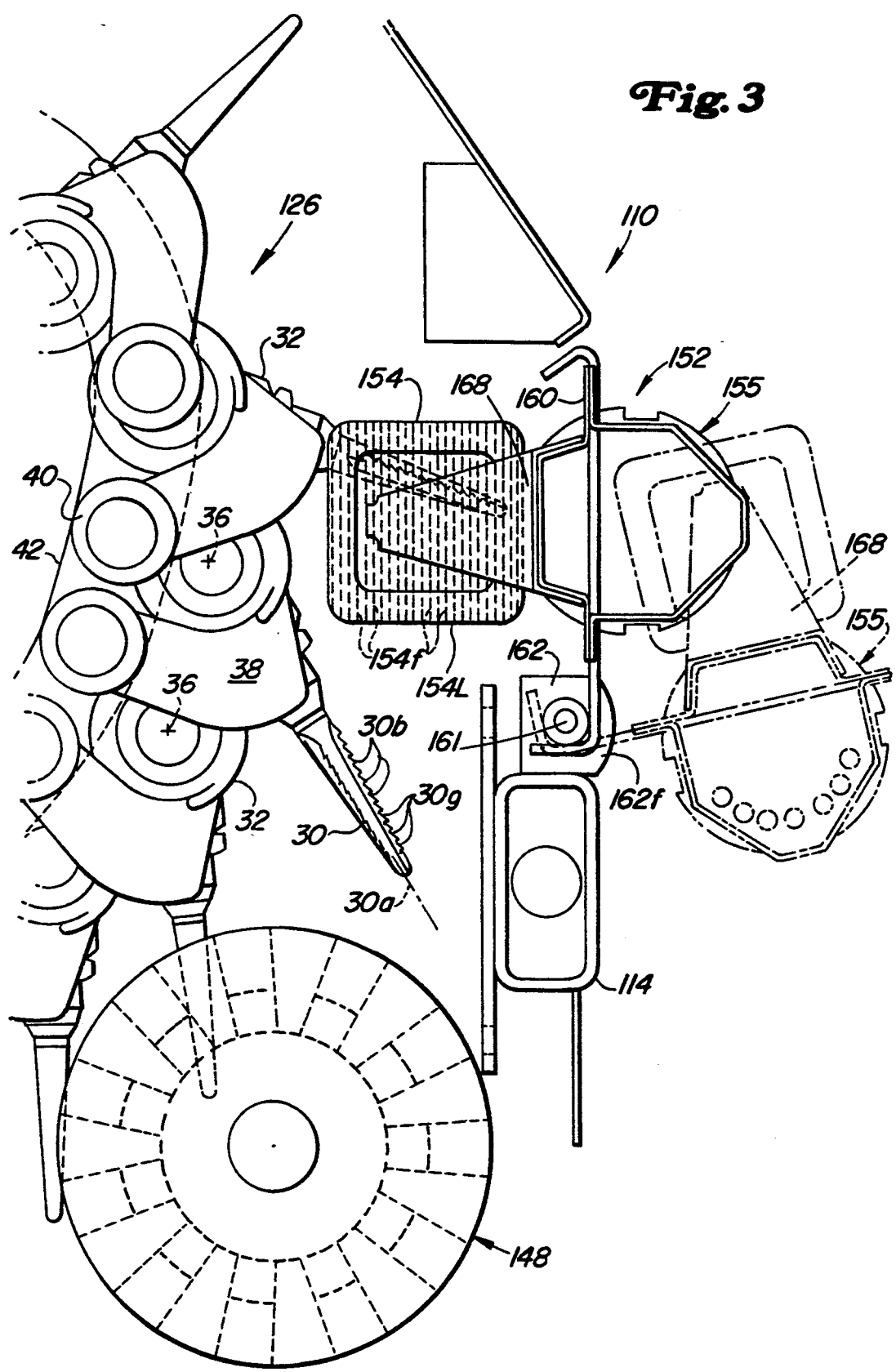

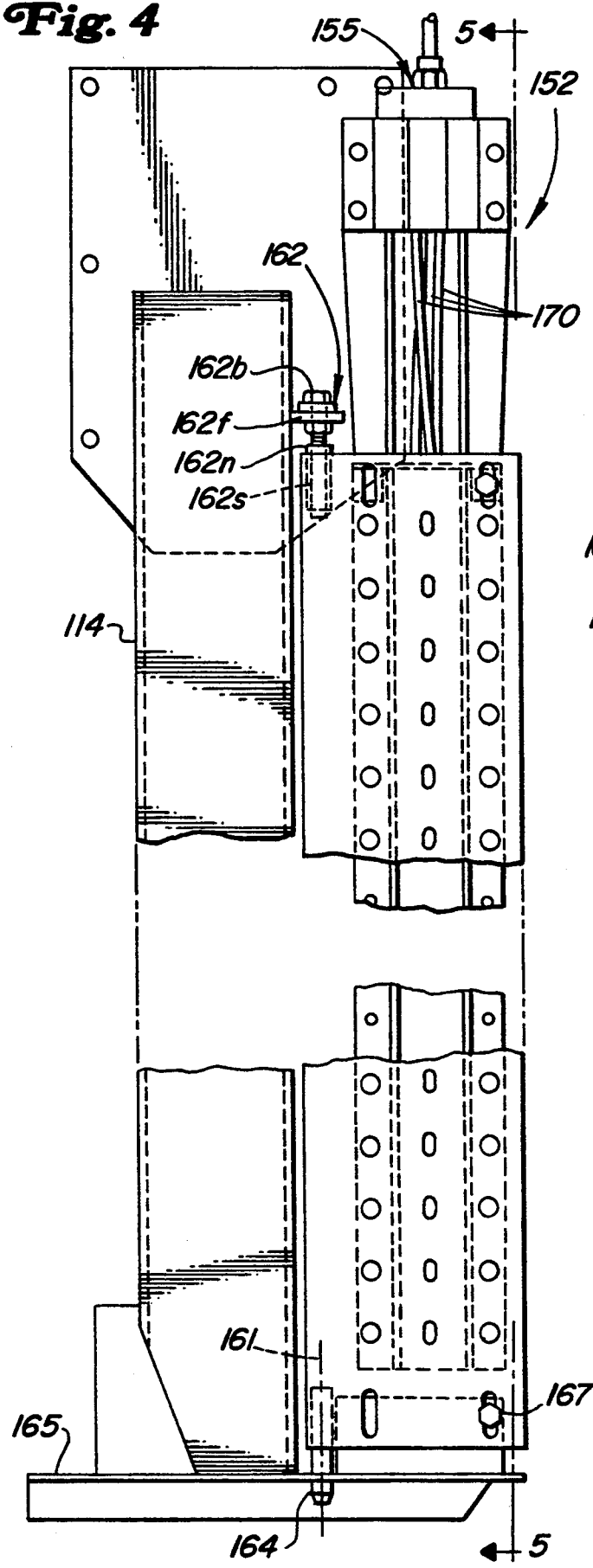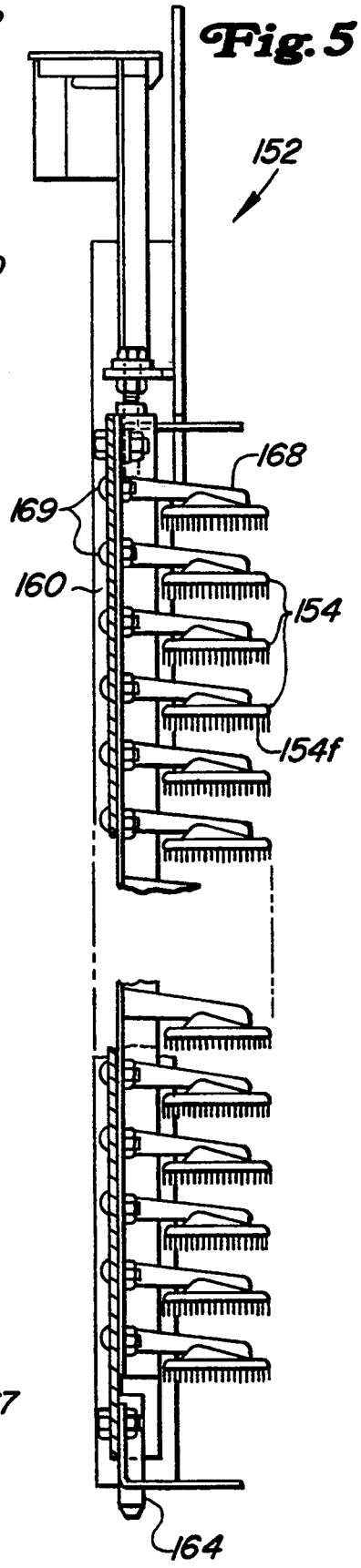

RELOCATED PIVOTING MOISTENER COLUMN FOR A COTTON PICKER

BACKGROUND OF THE INVENTION

1) Field of the Invention

The present invention relates generally to cotton harvesters, and more specifically to an improved cotton picker row unit structure.

2) Related Art

In the past, cotton harvesters of the spindle type such as the John Deere model 9910 Cotton Picker included row units with front and rear picker drums located to pick cotton from the opposite sides of the row. The forward drum typically included 16 upright bars of spindles and the rear drum had 12 bars of spindles. This configuration of drums required a relatively wide housing which limited the harvester to harvesting only two widely spaced (38 or 40 inches) rows. Recently, narrow row cotton harvesters which are capable of harvesting four or more rows of cotton spaced as narrowly as 30 inches have been commercially available. One type of narrow row harvester, exemplified by the Case-IH model 2055 Cotton Picker, has nested units with two 12-bar drums on opposite sides of the row. A second type of narrow row harvester, exemplified by the John Deere model 9960 Cotton Picker, utilizes two 12-bar drums located one behind the other on the same side of the row.

The standard row units contain upright moistener columns positioned forwardly of the front and rear drums. The columns include a series of pads, such as shown in U.S. Pat. No. 4,821,498 of common ownership with the present application, supported above the rows of spindles. A fluid line leading to a nozzle and distributor in the upper row unit housing delivers cleaning solution to the pads which, with the scrubbing action of the pads, helps keep the spindles clean. Proper cleaning is necessary to ensure maximum spindle picking efficiency and doffing. The moistener pads must be periodically replaced since they are subject to wear from constant contact with the spindles. Spindles wrapped with cotton can damage or remove pads from the column. Severely wrapped spindles will not pass through the moistener column and as a result cause the drum clutch to slip. The wrapped spindles must be accessed and the wraps removed before the unit can be restarted.

Servicing the moistener column and wrapped spindles has been a continuing source of difficulty with most available row units. Wrapped spindles often cannot clear the moistener pads and therefore prevent rotation of the drum for better access to the wrapped spindles.

Often, the upper housing area of the unit must be accessed to check the fluid nozzle and distributor of the moistener system. The nozzle and distributor are subject to contamination from the grease and dirt in the upper housing.

Other problems with conventional moistener columns include insufficient spindle time in the moistener column and moistener pad fin misalignment relative to the spindle barbs, both of which lead to less effective spindle cleaning. The moistener column location is at a point where picker bars accelerate for reentry into the row and so pass quickly through the column. The angle of the spindle relative to the moistener pad fins reduces cleaning action between the barbs.

A further problem with the moistener columns, especially in tandem drum units, is that the row unit length must be extended to accommodate the columns. The forward drum has to be spaced a sufficient distance ahead of the rear drum so that the rear moistener column does not interfere with the spindles on the forward drum. The forward extremity of the unit housing must also be extended a sufficient distance in the forward direction to accommodate the moistener column for the front drum. As a result, the length of the row unit is increased and the center of gravity of the unit is extended forwardly, which reduces maneuverability and adversely affects load distribution. In commonly owned copending application Ser. No. 07/849,925, filed Mar. 12, 1992 and entitled "HIGH SPEED TWO-DRUM ROW UNIT FOR A COTTON HARVESTER", a row unit is shown wherein the front drum cam is angled relative to the forward direction to facilitate closer placement of the drums and reduce row unit length. However, length reduction is hindered by the rear moistener column in that row unit.

BRIEF SUMMARY OF THE INVENTION

It is therefore an object of the present invention to provide an improved row unit for a cotton harvester. It is another object to provide such a unit which overcomes most or all of the aforementioned problems.

It is another object of the present invention to provide an improved row unit for a cotton harvester with an improved moistener column configuration. It is yet another object to provide such a unit which is shorter than conventional units and easier to service than most units. It is a further object to provide such a unit having a more effective spindle cleaning structure.

It is a further object of the invention to provide an improved cotton harvester row unit of the tandem drum type wherein a pair of drums located on one side only of the row. It is another object to provide such a row unit wherein the drums are more closely spaced and the center of gravity of the unit is located closer to the harvester wheels than with previously available tandem drum units. It is another object to provide such a unit with an improved moistener column structure for facilitating servicing. It is still another object to provide such a unit with improved spindle cleaning action.

It is yet another object to provide a cotton harvester row unit with an improved moistener column that is freer from contamination, more easily accessed and more effective in cleaning spindles than at least most previously available structures. It is another object to provide such a unit wherein the drum can be turned when spindles are wrapped without interference from the moistener column.

A cotton picker row unit includes a harvesting drum supported by the unit housing for rotation about an upright axis beside a row receiving area. The drum includes a plurality of spindles for picking cotton from a row of cotton plants in the row receiving area, and doffer structure located near the rear of the harvesting drum removes picked cotton from the spindles. An upright moistener column is located generally diametrically opposite the row receiving area near the side of the unit and substantially behind the forwardmost extremity of the harvesting drum. The spindles pass through the column at point in their path prior to the location where they begin accelerating for reentry into the row-receiving area. Therefore, the spindles spend more time in the column. The spindles, which include barbs projecting outwardly at an angle to the spindle axes with grooves defined between adjacent barbs, are supported with a lagging angle rather than with a leading angle in the moistener column area such that substantially the entire area of each of the grooves is opened to the fins during the pass through the column. The fins which are generally parallel to the direction of the barb projections, easily enter the grooves for enhanced spindle cleaning.

The moistener column is rotatable from a normal operating position to an open service position for easy access to the moistener pads and fluid distribution system without requiring access to the upper unit housing. The nozzle and distributor can be checked without risk of contamination by grease and dirt in the upper housing. The service position also permits picker drum rotation, when the spindles are wrapped, without interference from the moistener column.

By locating the column near the side of the unit, the fore-and-aft space requirements for a drum are reduced. In a tandem drum arrangement, the forward drum can be located closer to the rear drum without moistener column interference so that the center of gravity of the unit is moved rearwardly. The shorter units with relocated centers of gravity increase overall machine stability and maneuverability.

These and other objects, features and advantages of the present invention will become apparent to one skilled in the art upon reading the following detailed description in view of the drawings.

BRIEF DESCRIPTION OF THE DRAWINGS

FIG. 1 is a top view of a conventional row unit typical of the prior art.

FIG. 2 is a top view of the row unit of the present invention.

FIG. 3 is an enlarged top view showing the details of the moistener column structure and the orientation of the moistener pad relative to the spindle being wiped.

FIG. 4 is a side view of the moistener column.

FIG. 5 is a view taken generally along lines 5—5 of FIG. 4.

DETAILED DESCRIPTION OF THE DRAWINGS

The Prior Art

Referring now to FIG. 1, therein is shown a conventional row unit 10 for a cotton picker. The row unit 10 includes a housing 12 with upright structural members such as shown at locations 14–16. A fore-and-aft extending row-receiving area 20 is defined which extends rearwardly from between a pair of stalk lifters 22 through to the rear of the housing. Front and rear upright picker drums 26 and 27 with upright rotational axes 28 and 29 are supported within the housing 12 and include spindles 30 supported in rows by a plurality of upright picker bars 32. The spindles 30 include rows of barbs 30b which define elongated grooves 30g therebetween extending generally in the direction of rotation of the spindles. The picker bars 32 are supported for rotation about upright axes 36 uniformly spaced about a circle which centers on the rotational axis 28 of the drum. Each picker bar 32 includes a cam arm 38 with an upper cam roller 40 supported within the track of a cam 42 or 43 for the drum 26 or 27, respectively, which orients the bars 32 for the desired spindle position as the drum rotates about its upright axis. The spindles enter the row-receiving area in first and second drum rotation quadrants Q1 and Q2 in the counterclockwise direction from the forwardmost extremity of the drum (as viewed in FIG. 1).

Doffer columns 48 and 49 are supported for rotation about upright axes 50 and 51 parallel to and rearwardly and outwardly of the corresponding drum axes 28 and 29 (i.e., in the third quadrant Q3 from the forwardmost extremity of the drum) for doffing cotton from the spindles. Supported adjacent the forwardmost extremities of the drums 26 and 27 (in the fourth quadrant Q4) are upright moistener columns 52 and 53, each with spindle-wiping pads 54 connected to a nozzle and distribution system 55 located within the housing 12 for wiping the spindles 30 after cotton is doffed therefrom. The rear drum 27 is spaced a sufficient distance rearwardly of the forward drum 26 so that the path of the spindles 30 of the forward drum 26 does not intersect the rear moistener column 53.

A conventional drive mechanism (not shown) rotates the drums, spindles and doffers. As the drums 26 and 27 rotate in the counterclockwise direction as viewed in FIG. 1 through four quadrants (Q1–Q4) starting with the forwardmost portion of the drum, the path of the spindles 30 is controlled by the cam arrangement so that the spindles project into the row-receiving area through grid bars 64 and 65 (quadrants Q1 and Q2) and rotate in contact with the cotton. As shown in the drawings, the row unit 10 is an in-line unit with the drums and drum axes on one side only of the row-receiving area so that cotton is picked from one side of the plant. Pressure plates 66 and 67 urge the plants inwardly toward the spindles 30. The cotton-wrapped spindles 30 are moved under the doffers of the doffer columns 48 and 49 in quadrant Q3, and cotton is doffed from the spindles and directed rearwardly and outwardly to door structure 70 to be conveyed to the harvester basket (not shown).

As seen in FIG. 1, the cams 42 and 43 are elongated in the fore-and-aft direction and are oriented such that each has an elongate axis (see 72 and 73 of FIG. 1) which passes through the drum axis and is parallel to the row-receiving area 20 and the forward direction. In the conventional row unit, the elongate axes 72 and 73 are generally coextensive and intersect the axes of rotation 28 and 29 of the drums 26 and 28. The cams 42 and 43 have a comma-shaped configuration with an abrupt or relatively sharp changes of direction at the tail or rearmost portion 76. As the drums rotate, the cam configuration causes the spindle bar 32d near the rear of the drum to accelerate quickly and rotate about the bar axis through a transition area (between the row-receiving area and the doffer column) and into a position wherein the doffers can start to unwind cotton from the spindles 32. After the cotton is doffed and the spindles move into the fourth quadrant Q4, the cams accelerate the spindles quickly for reentry into the row receiving area 20. In the same quadrant Q4, the spindles pass through the moistener column. As the spindles 30 contact the pads 54 of the moistener column and begin to be reoriented for entry into the row-receiving area, the axes of the spindles are angled forwardly with respect to the leading and trailing edges of the pads (see drum 26 of FIG. 1).

Description of the Invention

Referring now to FIG. 2–5, the improved row unit structure 110 will be described in detail. The numbering for portions of the drive arrangement and individual picker bars for the improved unit 110 will remain the same as in the prior art discussion directly above since the construction is generally identical to that shown in FIG. 1. Therefore, with a few exceptions including row unit size and placement of the moistener columns and drums, the description of the structure for the unit 110 will parallel that of the unit 10.

The row unit 110 includes a housing 112 with upright structural members such as at locations 114–116. The upper portion of the housing 112 supports conventional drum, spindle and doffer drive structure (not shown). A fore-and-aft extending row-receiving area 120 is defined which extends rearwardly from between a pair of stalk lifters 122 through to the rear of the housing 112.

A front picker drum 126 and a smaller rear picker drum 127 are supported within the housing 112 for rotation about upright axes. The rotational axis of the larger drum 126 is offset farther outwardly from the row-receiving area 120 than the rear drum axis. The spindles 30 on each of the drums 126 and 127 enter the row receiving area 120 in the first quadrant Q1 and exit the area 120 in the second quadrant Q2. Upright doffer columns 148 and 149 are supported in the third quadrant Q3 rearwardly of and inwardly adjacent the upright members 114 and 115, respectively. The aft extremities of the columns 148 and 149 generally align with the aft extremity of the spindle paths on the corresponding drums 126 and 127.

Moistener columns 152 and 153 are rotatably mounted on the upright members 114 and 115, respectively, near the juncture of the third and fourth quadrants Q3 and Q4 on the side of the drum directly opposite the row receiving area 120, for movement between a normal operating position (FIG. 2 and solid lines of FIG. 3) and an outwardly directed service position (broken lines of FIG. 3). The columns 152 and 153 are similar in construction and operation, and therefore only the forward column 152 will be described in detail.

The moistener column 152 includes a series of moistener pads 154 supported in an upright column. The pads 154 are rectangular in configuration and have rows of parallel fore-and-aft extending fins 154f (FIG. 3) which are perpendicular to the a pad edge 154L which first contacts the spindles 30. The pads 154 are supported by a post or column 160 such that the spindles 30 rotate in contact with the fins 154f as the spindles move forwardly from the area of the doffer column 148 at a location diametrically opposite the row-receiving area 120. As can be appreciated from FIG. 3, the axes 30a of the spindles 30 lag or are angled rearwardly in the outward direction with respect to the edges 154L of the pads as the spindles traverse the pads. The spindles 30, which include barbs 30b projecting outwardly at an angle to the spindle axes and elongated grooves 30g defined between adjacent barbs, are oriented in the moistener column area such that substantially the entire area of each of the grooves 30g between pairs of barbs 30b is opened to the fins 154f during the pass through the column 152. The fins 154f, which are generally parallel to the direction of the barb projections, easily enter the grooves 30g for enhanced spindle cleaning.

The moistener column 152 includes a nozzle and distributor assembly 155 supported outside of the row unit upper housing for accessibility on the top of a post or support 160. The post 160 is pivotally connected to the structural member 114 for rotation about an upright axis 161 by an adjustable bracket assembly 162 and a lower pivot pin 164 slidably received in an aperture in an angle 165. The bracket 162 includes a threaded spacer 162s fixed to the post 160 and a bolt and bushing 162b extending downwardly through a flange 162f which projects forwardly from the upper portion of the member 114. The bolt 162 is threaded into the spacer s and lock nut 162n is tightened against the spacer to maintain a preselected column vertical portion. Bolts 167 (FIG. 4) releasibly secure the column 152 in the normal operating position.

Pad holders 168 are connected by bolts 169 at equally spaced locations along the post 160 and support the pads 154 in a column 152 so that the fins 154f on each of the pads contacts a row of spindles 30 when the column is in the operating position. Hoses or moistener lines 170 connect the nozzle and distributor assembly 155 at the top of the post 160 with the individual pads 154 to provide cleaning liquid through pad apertures between the pad fins for cleaning the rotating spindles 30 as they pass through the column. If further details of the moistener pad and support are desired, reference may be had to the aforementioned U.S. Pat. No. 4,821,498.

To service the moistener column area, the operator simply removes the bolts 167 and pivots the column 152 outwardly to the service position. The column 153 is mounted in a manner generally identical to that of the column 152 and can be swung out to a service position also. As best seen in FIGS. 3–5, the nozzle and distributor assembly 155 are easily accessible from outside the row unit housing, and pad inspection and replacement are simplified by the moistener column location and construction. When the spindles are wrapped and the doffers cannot remove the wrapped cotton, the columns 152 and 153 can be swung out to the service positions so the drum can be turned for servicing without interference from the pads 154.

Having described the preferred embodiment, it will become apparent that various modifications can be made without departing from the scope of the invention is defined in the accompanying claims.

We claim:

1. In a cotton harvester for harvesting cotton planted in rows, a row unit comprising:
   a row unit housing defining a fore-and-aft extending row receiving area;
   a harvesting drum supported by the housing for rotation about an upright axis beside the row receiving area, the drum including a plurality of spindles for picking cotton from a row of cotton plants in the row receiving area, the spindles moveable with the drum generally along a circular path about the upright axis;
   doffer structure located near the rear of the harvesting drum approximately one-quarter revolution of the drum from the location where the spindles leave the row receiving area for removing picked cotton from the spindles; and
   an upright moistener column located on the side of the harvesting drum opposite the row receiving area and substantially behind the forwardmost extremity of the harvesting drum less than one-half of a revolution of the drum from the location where the spindles leave the row receiving area and greater than a quarter drum revolution from the location where the spindles reenter the row receiving area, the column having spindle cleaning structure for cleaning the spindles after the picked cotton is removed from the spindles.

2. The invention as set forth in claim 1 wherein the upright moistener column includes fluid distribution structure located adjacent the side of the unit above the spindle cleaning structure and outwardly of the row unit housing.

3. The invention as set forth in claim 1 wherein the picker drum operates in four quadrants in the direction of rotation of the drum, and wherein in a first and a second quadrant the spindles enter and leave the row-receiving area, and in a third quadrant the doffer removes cotton from the spindles, and wherein the moistener column is located near the juncture of the third and fourth quadrants.

4. The invention as set forth in claim 1 wherein the moistener column is offset at least one-quarter of a drum revolution from the row receiving area.

5. The invention as set forth in claim 1 wherein the moistener column is located within one-quarter of a drum revolution of the doffer column.

6. The invention as set forth in claim 1 including means supporting the moistener column from the housing for moving the moistener column between a normal working position and an outward service position.

7. In a cotton harvester for harvesting cotton planted in rows, a row unit comprising:
a row unit housing defining a fore-and-aft extending row receiving area;
a harvesting drum supported by the housing for rotation about an upright axis beside the row receiving area, the drum including a plurality of spindles for picking cotton from a row of cotton plants in the row receiving area;
doffer structure located adjacent the spindles out of the row receiving area for removing picked cotton from the spindles;
an upright moistener column located adjacent the doffer structure within approximately 90 degrees of rotation of the harvesting drum from the doffer column, the column having spindle cleaning structure for cleaning the spindles after the picked cotton is removed from the spindles; and
wherein the picker drum operates in four quadrants in the direction of rotation of the drum, including a first and a second quadrant wherein the spindles enter and leave the row-receiving area, and a third quadrant wherein the doffer removes cotton from the spindles, and the moistener column is located near the juncture of the third and fourth quadrants.

8. The invention as set forth in claim 7 wherein the upright moistener column includes fluid distribution structure located adjacent the side of the unit above the spindle cleaning structure and outwardly of the row unit housing.

9. In a cotton harvester for harvesting cotton planted in rows, a row unit comprising:
a row unit housing defining a fore-and-aft extending row receiving area;
a forward and a rearward upright harvesting drum located on one side of the row receiving area for picking cotton from one side only of a row of cotton plants in the row-receiving area, the forward and rearward drums including upright picker bars rotatable about upright axes and supporting cotton picking spindles;
upright doffer columns supported adjacent the drums at locations offset from the row-receiving area for doffing cotton from the spindles;
an upright moistener column located adjacent each doffer column within approximately a one-quarter drum revolution of the doffer column ;and
wherein the row unit comprises an upright structural member located outwardly of the drum, aped wherein the moistener column and doffer column are located on opposite sides of the upright structural member, and the moistener column is pivotally connected to the upright structural member.

10. In a cotton harvester for harvesting cotton planted in rows, a row unit comprising:
a row unit housing defining a fore-and-aft extending row receiving area;
a forward and a rearward upright harvesting drum located on one side of the row receiving area for picking cotton from one side only of a row of cotton plants in the row-receiving area, the forward and rearward drums including upright picker bars rotatable about upright axes and supporting cotton picking spindles;
upright doffer columns supported adjacent the drums at locations offset from the row-receiving area for doffing cotton from the spindles; and
an upright moistener column located adjacent each doffer column within approximately a one-quarter drum revolution of the doffer column and substantially greater than a one-quarter drum revolution from a location where the spindles reenter the row receiving area.

11. The invention as set forth in claim 10 wherein each of the doffer columns is supported adjacent the aft extremity of the drum and the moistener column is located on the side of the drum opposite the row receiving area.

12. The invention as set forth in claim 10 wherein the row unit comprises an upright structural member located outwardly of the drum, and wherein the moistener column and doffer column are located on opposite sides of the upright structural member.

13. The invention as set forth in claim 10 including means for supporting the upper end of the moistener column outside of the row unit housing.

14. The invention as set forth in claim 10 wherein the spindles define spindle paths, each path having forwardmost and rearwardmost extremities, and wherein the forwardmost extremity of the rear drum spindle path is located adjacent the rearwardmost extremity of the forward drum spindle path, the distance between the adjacent paths being substantially less than the effective working dimension of the moistener column.

15. The invention as set forth in claim 10 wherein the upright moistener column includes a plurality of pads, the pads including fins supported in cleaning relationship with the spindles, the fins being substantially parallel to each other and extending in the fore-and-aft direction.

16. In a cotton harvester for harvesting cotton planted in rows, a row unit comprising:
a row unit housing defining a fore-and-aft extending row receiving area;
a harvesting drum supported by the housing for rotation about an upright axis beside the row receiving area, the drum including a plurality of spindles supported for rotation about spindle axes from upright picker bars, cam structure for orienting the bars about vertical axes and moving the spindles in parallel spindle paths as the drum rotates, and wherein the spindles include spindle barbs defining spindle grooves offset at an angle to the spindle axes;

doffer structure located adjacent the spindles out of the row recieving area for removing picked cotton from the spindles;

wherein the picker drum operates in four quadrants in the direction of rotation of the drum, including a first and a second quadrant wherein the spindles enter and leav the row-receiving area, and a third quadrant wherein the doffer removes cotton from the spindles, and the moistener column is located near the juncture of the third and fourth quadrants; and an upright moistener column located in the spindle paths, the column having spindle cleaning pads with rows of parallel fins for cleaning the spindles after the picked cotton is removed from the spindles, the moistener column including means supporting the pads adjacent the spindles such that the rows of fins are generally parallel to the path of the spindles and to the grooves while the spindles are in contact with the pads to facilitate entry of the fins between the barbs.

17. The invention as set forth in claim 16 wherein the pads include first edges perpendicular to the fins and generally transverse to the spindle path, and wherein the axes of the spindles are angled rearwardly in the outward direction with respect to the first edges as the spindles traverse the pads.

18. The invention as set forth in claim 16 wherein the upright moistener column includes fluid distribution structure located adjacent the side of the unit above the spindle cleaning structure and outwardly of the row unit housing.

19. The invention as set forth in claim 16 wherein the moistener column is supported at a location on the side of the drum opposite the row-receiving area.

* * * * *